(12) United States Patent
Teraoka

(10) Patent No.: US 9,575,287 B2
(45) Date of Patent: Feb. 21, 2017

(54) CAMERA LENS

(71) Applicant: Hiroyuki Teraoka, Shenzhen (CN)

(72) Inventor: Hiroyuki Teraoka, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/011,598

(22) Filed: Jan. 31, 2016

(65) Prior Publication Data

US 2017/0010440 A1   Jan. 12, 2017

(30) Foreign Application Priority Data

Jul. 9, 2015   (JP) .................................. 2015-137895

(51) Int. Cl.
*G02B 3/02*     (2006.01)
*G02B 13/00*    (2006.01)
*G02B 9/34*     (2006.01)
*G02B 27/00*    (2006.01)
*H04N 5/225*    (2006.01)

(52) U.S. Cl.
CPC ............... *G02B 13/004* (2013.01); *G02B 9/34* (2013.01); *G02B 27/0025* (2013.01); *H04N 5/2254* (2013.01)

(58) Field of Classification Search
CPC ............. G02B 13/18; G02B 3/04; G02B 9/34; G02B 13/04; G02B 9/60
USPC .......................................... 359/708, 713–715
See application file for complete search history.

(56) References Cited

U.S. PATENT DOCUMENTS

2012/0194925 A1*   8/2012   Teraoka ........................ 359/773

FOREIGN PATENT DOCUMENTS

JP       2015-034940        2/2015
JP        5667323           2/2015

* cited by examiner

*Primary Examiner* — James Greece
(74) *Attorney, Agent, or Firm* — Na Xu; IPro, PLLC

(57) ABSTRACT

A camera lens includes, lined up from the object side to the image side, a first lens with positive refractive power, a second lens with negative refractive power, a third lens with positive refractive power, and a fourth lens with negative refractive power. The camera lens satisfies specific conditions.

3 Claims, 5 Drawing Sheets

CAMERA LENS

FIELD OF THE INVENTION

The present disclosure is related to a camera lens, and more particularly to a camera lens comprising 4 lenses.

DESCRIPTION OF RELATED ART

In recent years, a variety of cameras equipped with CCD, CMOS or other camera elements are widely popular. Along with the development of miniature and high performance camera elements, the ultrathin and high-luminous flux (Fno) wide-angle camera lenses with excellent optical properties are needed in society.

The technology related to the camera lens composed of 4 small high-luminous flux wide angle lenses with excellent optical properties is developed step by step. The camera lens mentioned in the proposal is composed of 4 lenses lined up from the object side in turn as follows: a first lens with positive refractive power, a second lens with negative refractive power, a third lens with positive refractive power, a fourth lens with negative refractive power.

The camera lens disclosed in embodiments 1 to 6 of the patent document 1 is composed of 4 lenses above, but the distribution of refractive power of the first lens and the second lens, the shape of the first lens and the second lens are inadequate, as a result, 2 ω≤74.2°, Fno≥2.41, wide-angle and Fno luminous flux are not sufficient.

The camera lens disclosed in embodiments 1-4 of the patent document 2 is composed of 4 lenses, but the distribution of refractive power of the second lens, the shape of the first lens are inadequate, as a result, Fno=2.4 and Fno luminous flux are not sufficient.

Existing technical references:
Patent document 1: JP Patent Publication No. 2015-034940
Patent document 2: JP Patent No. 5667323

Therefore, it is necessary to provide a new camera lens to overcome the problems mentioned above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

Figure 1:
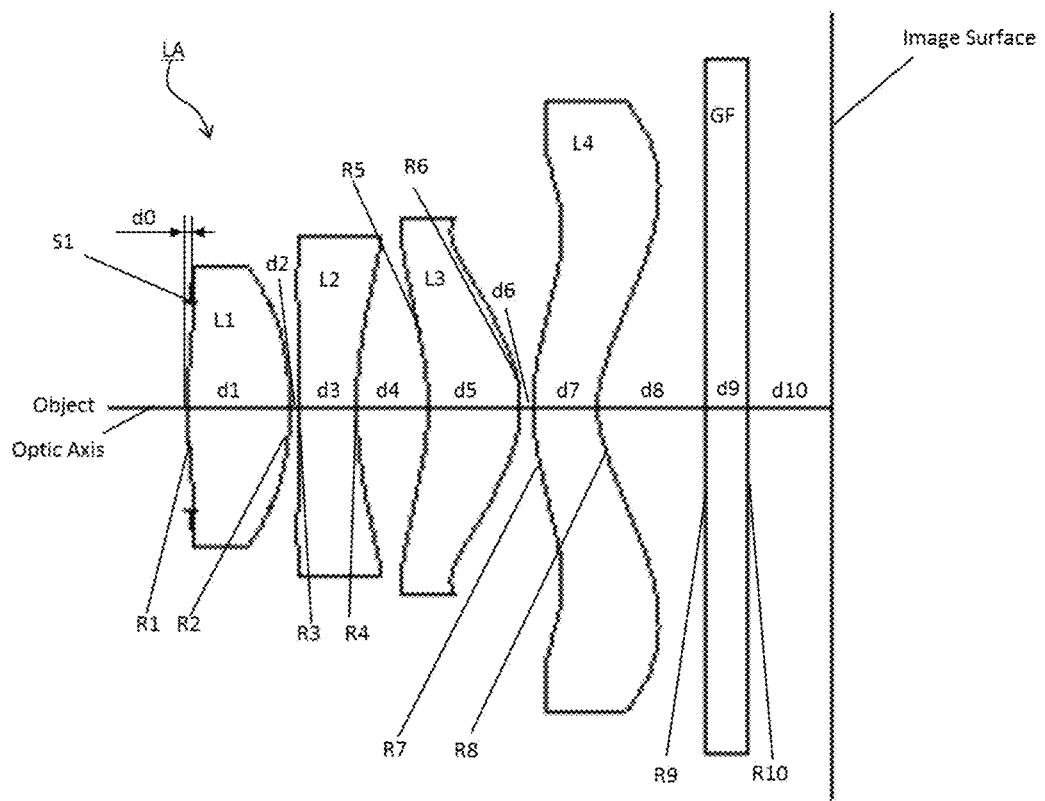
FIG. 1 is the structure diagram of the camera lens LA in one embodiment of the present invention.

FIG. 1 shows the structural diagram of one embodiment of the camera lens of the present invention; The camera lens LA is composed of 4 lenses, lined up from the object side to the image side in turn as follows: a first lens L1, a second lens L2, a third lens L3 and a fourth lens L4. A glass plate GF is provided between the fourth lens L4 and the imaging plane. The glass plate GF is a glass cover or a light filter with IR cut-off filtration and other functions, or, the glass plate GF is not be provided between the lens L4 and the imaging plane.

The first lens L1 has positive refractive power. The second lens L2 has negative refractive power. The third lens L3 has positive refractive power. The fourth lens L4 has negative refractive power. In order to correct aberration better, the surface of four lenses is best designed to be non-spherical shape.

The camera lens LA satisfies the following specific conditions (1) to (4).

$$0.90 \leq F1/F \leq 1.15 \quad (1)$$

$$-2.50 \leq F2/F \leq -1.60 \quad (2)$$

$$0.05 \leq (R1+R2)/(R1-R2) \leq 0.30 \quad (3)$$

$$1.50 \leq (R3+R4)/(R3-R4) \leq 3.00 \quad (4)$$

In which
F: Overall focal distance of the lenses
F1: The focal distance of the first lens
F2: The focal distance of the second lens
R1: The object side curvature radius of the first lens
R2: The image side curvature radius of the first lens
R3: The object side curvature radius of the second lens
R4: The image side curvature radius of the second lens.

The condition (1) specifies the positive refractive power of the first lens L1. When exceeding the lower limit value of the condition (1), the first lens L1 has too big positive refractive power, it is difficult to correct the aberration and other issues, also not conducive to wide-angle development of lens.

On the contrary, when exceeding the upper limit value, the first lens L1 has too weak positive refractive power, it is not conducive to the small type development of lens.

The condition (2) specifies the positive refractive power of the second lens L2. When exceeding the lower limit value of the condition (2), the second lens has too small negative refractive power, it is difficult to correct the axial and abaxial chromatic aberration. On the contrary, when exceeding the upper limit, the second lens has too big negative refractive power, it is difficult to correct the aberration and other issues. The higher aberration and the image side surface distortion issue caused by the axial misalignment of the second lens and other reasons will be increased.

The condition (3) specifies the shape of the first lens L1. If exceeding the limit of the condition (3), it is not conducive to Fno≤2.2 wide angle miniaturization development of lens.

The condition (4) specifies the shape of the second lens L2. If exceeding the limit of the condition (4), it is not conducive to Fno≤2.2 wide angle and ultra-thin development of lens.

The third lens L3 has positive refractive power and satisfies the following condition (5)

$$0.60 \leq F3/F \leq 0.95 \quad (5)$$

In which
F: Overall focal distance of the lenses
F3: The focal distance of the third lens.

The condition (5) specifies the positive refractive power of the third lens L3. When exceeding the lower limit value, the third lens has too big positive refractive power, and the higher aberration and the image side surface distortion caused by the axial misalignment of the third lens and other reasons will be increased. This is not good. On the contrary, when exceeding the upper limit value, the third lens has too weak positive refractive power, it is not conducive to the miniaturization development of lens.

The fourth lens L4 has positive refractive power and satisfies the following condition (6).

$$-2.50 \leq F4/F \leq -1.00 \quad (6)$$

In which
F: Overall focal distance of the lenses
F4: The focal distance of the fourth lens.

The condition (6) specifies the negative refractive power of the fourth lens L4. When exceeding the lower limit, Difficult to correct the abaxial chromatic aberration. When exceeding the upper limit, the high aberration and the image side surface distortion caused by the axial misalignment of the fourth lens and other reasons will be increased. This is not good.

As four lenses of the camera lens LA have the structure described above and meet all conditions, the camera lens with 4 high-luminous flux lenses with excellent optical properties, in wide-angle 2ω≥80° and small, Fno≤2.2 becomes possible.

The camera lens LA of the present invention is described with the embodiments as follows. The symbols in all embodiments are represented as follows. In addition, the unit of the distance, radius and center thickness is mm.
F: Overall focal distance of the camera lens LA
F1: The focal distance of the first lens L1
F2: The focal distance of the second lens L2
F3: The focal distance of the third lens L3
F4: The focal distance of the fourth lens L4
Fno: F value
2ω: Total angle of view
S1: Open aperture
R: The curvature radius of the optical surface is the center curvature radius of lens;
R1: The object side curvature radius of the first lens L1
R2: The image side curvature radius of the first lens L1
R3: The object side curvature radius of the second lens L2
R4: The image side curvature radius of the second lens L2
R5: The object side curvature radius of the third lens L3
R6: The image side curvature radius of the third lens L3.
R7: The object side curvature radius of the fourth lens L4
R8: The image side curvature radius of the fourth lens L4
R9: The object side curvature radius of the glass plate GF
R10: The image side curvature radius of glass plate GF
D: The center thickness of lenses and the distance between lenses
D0: The axial distance from the open aperture S1 to the object side of the first lens L1
D1: The center thickness of the first lens L1
D2: The axial distance between the image side of the first lens L1 and the object side of the second lens L2
D3: The center thickness of the second lens L2
D4: The axial distance between the image side of the second lens L2 and the object side of the third lens L3
D5: The center thickness of the third lens L3
D6: The axial distance between the image side of the third lens L3 and the object side of the fourth lens L4
D7: The center thickness of the fourth lens L4
D8: The axial distance between the image side of fourth lens L4 and the object side of the glass plate GF
D9: The center thickness of the glass plate GF
D10: The axial distance from the image side to the imaging plane of the glass plate GF
nD: Refractive power of line D
n1: Refractive power of line D of the first lens L1,
n2: Refractive power of line D of the second lens L2,
n3: Refractive power of line D of the third lens L3,
n4: Refractive power of line D of the fourth lens L4,
n5: Refractive power of line D of glass plate GF
vD: Abbe number
v1: Abbe number of the first lens L1
v2: Abbe number of the second lens L2
v3: Abbe number of the third lens L3
v4: Abbe number of the fourth lens L4
v5: Abbe number of the fifth lens L5
TTL: Optical length (the axial distance from the object side to the imaging
plane of the first lens L1)
LB: The axial distance from the image side to the imaging plane of the fifths lens L5 (including the thickness of the glass plate GF).
IH: Image height $$y = (x2/R)/[1 + \{1 - (k+1)(x2/R2)\}1/2] + A4 \times 4 + A6 \times 6 + \quad (7)$$
$$A8 \times 8 + A10 \times 10 + A12 \times 12 + A14 \times 14 + A16 \times 16$$

In which, R is the axial curvature radius; k is the cone constant; A4, A6, A8, A10, A12, A14, A16 are aspherical coefficients.

As a matter of convenience, the aspheric surface of all lenses adopts the aspheric surface in condition (7). But, not limited to the polynomial forms of the aspheric surface in expression (7).

Figure 2:
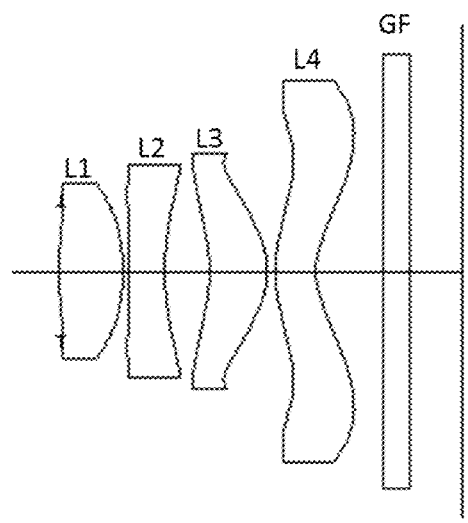
FIG. 2 is the structure diagram of the camera lens LA of the embodiment 1.

FIG. 2 is the structural diagram of the camera lens LA of embodiment 1; The data in table 1 includes: The curvature radius R of the object side and the image side of the first lens L1 to the fourth lens L4 of the camera lens LA in embodiment 1, the center thickness of the lens and the distance D between lenses, refractive index nD, Abbe number v. The cone constant k and aspherical coefficient are shown in table 2.

TABLE 1

|     | R        | d         |       | nd    |    | v d  |
|-----|----------|-----------|-------|-------|----|------|
| S1  | ∞        | d0 =      | −0.010|       |    |      |
| R1  | 2.42361  | d1 =      | 0.482 | n1 1.544 | v 1 | 56.1 |
| R2  | −1.79127 | d2 =      | 0.050 |       |    |      |
| R3  | 8.58546  | d3 =      | 0.266 | n2 1.645 | v 2 | 22.4 |
| R4  | 1.85172  | d4 =      | 0.330 |       |    |      |
| R5  | −1.18920 | d5 =      | 0.433 | n3 1.544 | v 3 | 56.1 |
| R6  | −0.60226 | d6 =      | 0.060 |       |    |      |
| R7  | 1.04228  | d7 =      | 0.309 | n4 1.535 | v 4 | 56.1 |
| R8  | 0.52653  | d8 =      | 0.500 |       |    |      |
| R9  | ∞        | d9 =      | 0.210 | n5 1.517 | v 5 | 64.2 |
| R10 | ∞        | d10 =     | 0.401 |       |    |      |

TABLE 2

| Cone Constant | Aspherical Coefficient | | | | | | |
|---|---|---|---|---|---|---|---|
| k | A4 | A6 | A8 | A10 | A12 | A14 | A16 |
| R1 −2.37E+01 | −3.00E−02 | −3.12E−01 | −4.50E+00 | 1.01E+01 | 7.41E+01 | −5.05E+02 | 8.61E+02 |
| R2 1.99E+00 | −6.06E−01 | 5.10E−01 | 2.50E+00 | −9.18E+00 | −2.82E+00 | 6.63E+01 | −8.56E+01 |
| R3 0.00E+00 | −7.00E−01 | 7.46E−01 | 1.34E+00 | 1.21E+00 | −5.20E+00 | −5.04E−01 | 2.81E+00 |
| R4 0.00E+00 | −8.35E−02 | −4.72E−01 | 5.19E−01 | 8.32E−01 | 1.58E−02 | −2.95E+00 | 1.65E+00 |
| R5 −6.10E+00 | 2.56E−01 | −1.42E−01 | −6.58E−02 | −3.31E−01 | −2.03E−01 | 2.59E+00 | −1.93E+00 |
| R6 −3.49E+00 | −3.22E−01 | 5.61E−01 | −9.69E−02 | −3.59E−01 | 1.62E−01 | 6.48E−01 | −1.31E−01 |
| R7 −5.64E+00 | −1.70E−01 | −1.53E−02 | 5.03E−03 | 4.46E−03 | 2.11E−03 | 2.13E−03 | −4.17E−04 |
| R8 −4.46E+00 | −1.29E−01 | 1.27E−02 | −7.16E−03 | 4.28E−03 | −1.43E−04 | −1.56E−03 | 5.26E−04 |

Values shown in table 5 below include: The values of the embodiments 1~2 and the corresponding values of the parameters specified in the conditions (1)~(6).

As shown in table 5, the embodiment 1 meets the condition expression (1) to (6).

Figure 3:
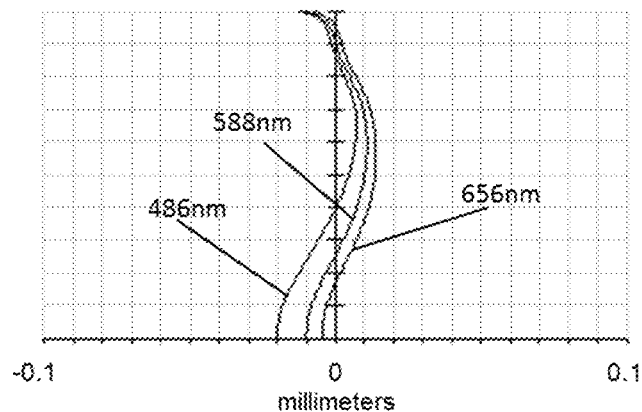
FIG. 3 is the diagram of the spherical aberration (axial chromatic aberration) of the camera lens LA of embodiment 1.
Figure 4:
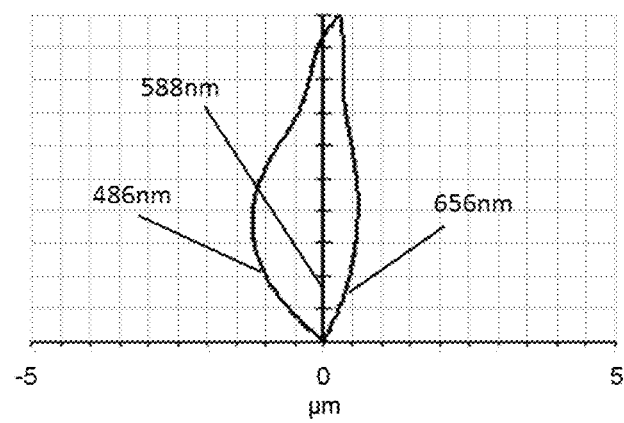
FIG. 4 is the diagram of the magnification chromatic aberration of the camera lens LA og embodiment 1.
Figure 5:
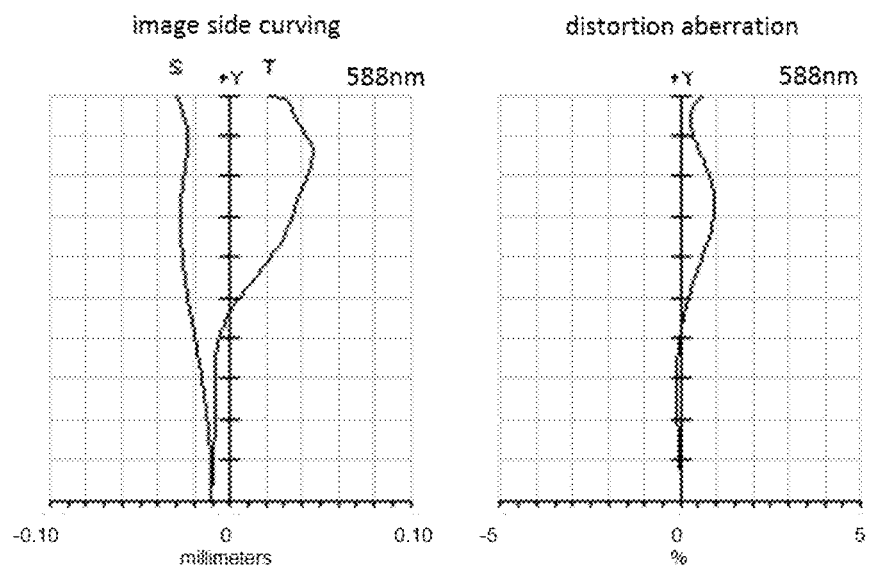
FIG. 5 is the diagram of the image side curving and distortion aberration of the camera lens LA of embodiment 1.

FIG. 3 is the diagram of the spherical aberration (axial chromatic aberration) of the camera lens LA in the embodiment 1; FIG. 4 is the diagram of the magnification chromatic aberration; FIG. 5 is the diagram of the image side curving and distortion aberration; In addition, the image side curving S in FIG. 5 is the image side curving relative to sagittal plane. T is the image side curving relative to the tangent image side. It is same also in embodiment 2 and 3. In embodiment 1, the camera lens LA with 2ω=81.0°, TTL/IH=3.050 mm, Fno=2.15 ultra-thin, high-luminous flux wide-angle lenses, as shown in FIGS. 3-5, is easy to understand that it has excellent optical properties.

Figure 6:
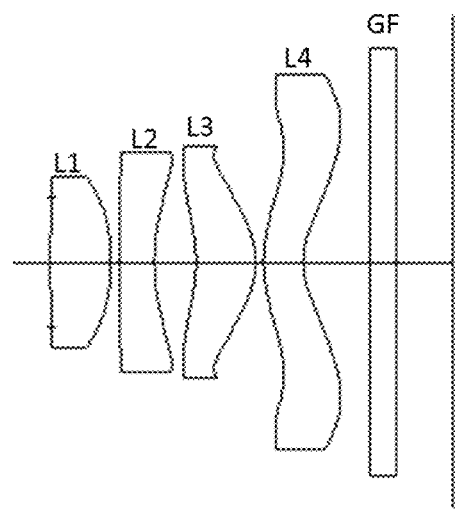
FIG. 6 is the structure diagram of the camera lens LA of embodiment 2.

FIG. 6 is the structural diagram of the camera lens LA in the embodiment 2. The curvature radius R of the object side and image side of the first lens L1 to fourth lens L4, center thickness of the lenses or the distance D between the lenses, refractive power nD and Abbe number ν of the camera lens LA in the embodiment 2 are shown in table 3. The cone constant k and aspherical coefficient are shown in table 4.

TABLE 3

| | R | d | nd | νd |
|---|---|---|---|---|
| S1 | ∞ | d0 = −0.015 | | |
| R1 | 3.04958 | d1 = 0.460 | n1 1.544 | ν1 56.1 |
| R2 | −1.90931 | d2 = 0.060 | | |
| R3 | 3.19503 | d3 = 0.270 | n2 1.645 | ν2 22.4 |
| R4 | 1.49095 | d4 = 0.316 | | |
| R5 | −1.15627 | d5 = 0.450 | n3 1.544 | ν3 56.1 |
| R6 | −0.58465 | d6 = 0.060 | | |
| R7 | 0.99302 | d7 = 0.300 | n4 1.535 | ν4 56.1 |
| R8 | 0.51277 | d8 = 0.500 | | |
| R9 | ∞ | d9 = 0.210 | n5 1.517 | ν5 64.2 |
| R10 | ∞ | d10 = 0.423 | | |

TABLE 4

| Cone Constant | Aspherical Coefficient | | | | | | |
|---|---|---|---|---|---|---|---|
| k | A4 | A6 | A8 | A10 | A12 | A14 | A16 |
| R1 −1.14E+01 | −1.66E−01 | −3.34E−01 | −4.21E+00 | 1.12E+01 | 7.64E+01 | −4.90E+02 | 7.53E+02 |
| R2 1.86E+00 | −6.23E−01 | 5.50E−01 | 2.29E+00 | −9.29E+00 | −3.32E+00 | 6.61E+01 | −8.05E+01 |
| R3 0.00E+00 | −6.66E−01 | 5.53E−01 | 8.93E−01 | 1.27E+00 | −4.20E+00 | 1.06E+00 | 9.88E−02 |
| R4 0.00E+00 | −1.04E−01 | −5.50E−01 | 5.36E−01 | 8.05E−01 | −1.07E−01 | −3.07E+00 | 1.80E+00 |
| R5 −7.74E+00 | 2.85E−01 | −1.04E−01 | 6.76E−03 | −3.25E−01 | −2.30E−01 | 2.44E+00 | −2.22E+00 |
| R6 −3.81E+00 | −3.30E−01 | 5.59E−01 | −8.52E−02 | −3.35E−01 | 1.92E−01 | 6.65E−01 | −1.53E−01 |
| R7 −5.02E+00 | −1.67E−01 | −1.62E−02 | 4.38E−03 | 4.22E−03 | 2.10E−03 | 2.21E−03 | −3.18E−04 |
| R8 −4.48E+00 | −1.35E−01 | 1.39E−02 | −6.78E−03 | 4.39E−03 | −1.15E−04 | −1.55E−03 | 5.39E−04 |

As shown in table 5, the embodiment 2 satisfies the conditions (1)-(6).

Figure 7:
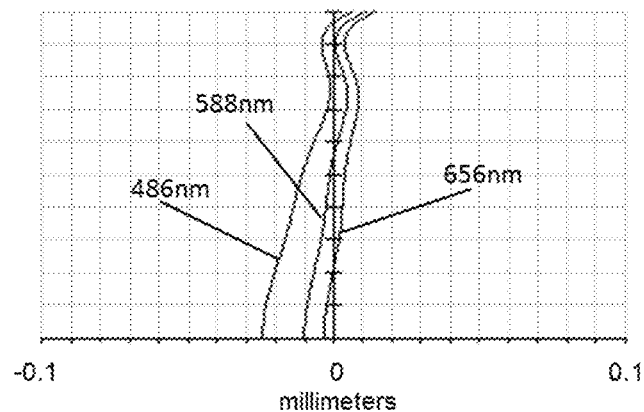
FIG. 7 is the diagram of the spherical aberration (axial chromatic aberration) of the camera lens LA of embodiment 2.
Figure 8:
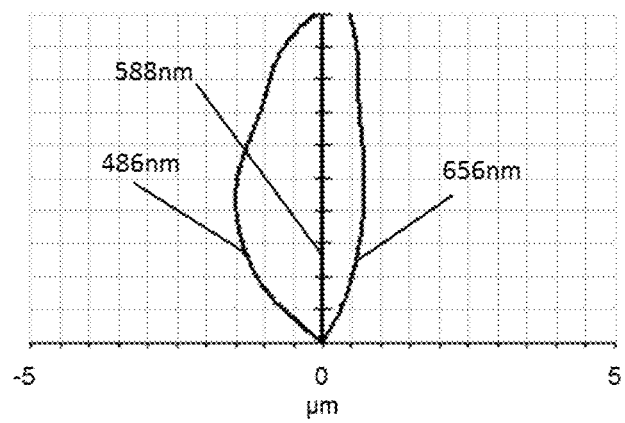
FIG. 8 is the diagram of the magnification chromatic aberration of the camera lens LA of embodiment 2.
Figure 9:
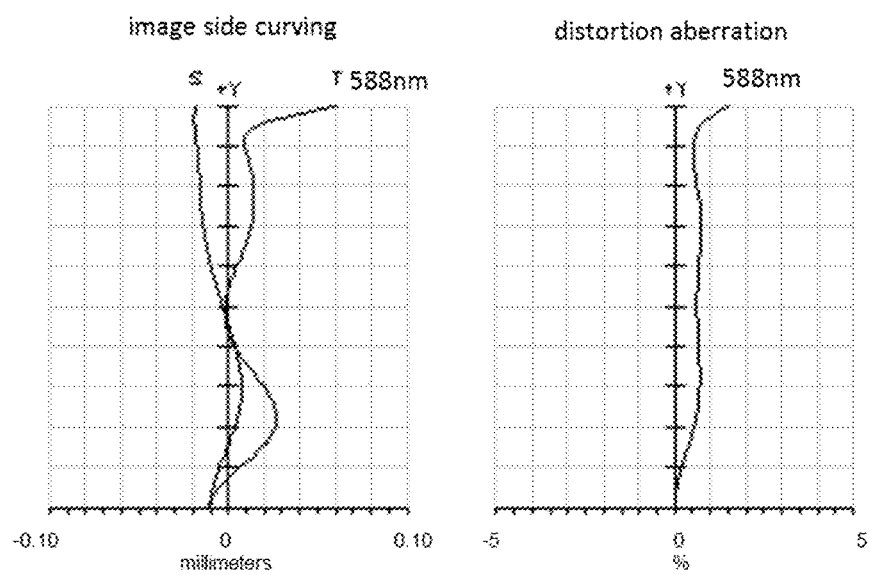
FIG. 9 is the diagram of the image side curving and distortion aberration of the camera lens LA of embodiment 2.

FIG. 7 is the diagram of the spherical aberration (axial chromatic aberration) of the camera lens LA in the embodiment 2;

FIG. 8 is the diagram of the magnification chromatic aberration; FIG. 9 is the diagram of the image side curving and distortion aberration; As shown in FIGS. 7 to 9, for full image angle 2ω=81.6°, TTL/IH=3.049, Fno=2.10 ultra-thin, high-luminous flux wide-angle lenses of the camera lens LA in the embodiment 2 are easy to understand that they have excellent optical properties.

The values of the embodiments and the corresponding values of the parameters specified in conditions (1)-(6) are listed in table 5. In addition, the units in table 5 are 2 ω(°), F (mm), F1 (mm), F2 (mm), F3 (mm), F4 (mm), TTL (mm), LB (mm), IH (mm)

TABLE 5

| | Embodiment 1 | Embodiment 2 | Condition |
|---|---|---|---|
| f1/f | 0.936 | 1.078 | (1) |
| f2/f | −1.777 | −2.250 | (2) |
| (R1 + R2)/(R1 − R2) | 0.150 | 0.230 | (3) |
| (R3 + R4)/(R3 − R4) | 1.550 | 2.750 | (4) |
| f3/f | 0.844 | 0.822 | (5) |
| f4/f | −1.192 | −1.224 | (6) |
| Fno | 2.15 | 2.10 | |
| 2ω | 81.0 | 81.6 | |
| f | 2.109 | 2.070 | |
| f1 | 1.973 | 2.231 | |
| f2 | −3.748 | −4.658 | |
| f3 | 1.780 | 1.702 | |
| f4 | −2.513 | −2.533 | |
| TTL | 3.050 | 3.049 | |
| LB | 1.111 | 1.133 | |
| IH | 1.820 | 1.820 | |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera lens comprising, lined up from the object side to the image side, a first lens with positive refractive power, a second lens with negative refractive power, a third lens with positive refractive power, and a fourth lens with negative refractive power, wherein the camera lens satisfies the following conditions (1)-(3):

$$0.90 \leq F1/F \leq 1.15 \tag{1}$$

$$-2.50 \leq F2/F \leq -1.60 \tag{2}$$

$$0.05 \leq (R1+R2)/(R1-R2) \leq 0.30 \tag{3}$$

$$1.50 \leq (R3+R4)/(R3-R4) \leq 3.00 \tag{4}$$

In which,
F: Overall focal distance of the lenses
F1: The focal distance of the first lens
F2: The focal distance of the second lens
R1: The object side curvature radius of the first lens
R2: The image side curvature radius of the first lens
R3: The object side curvature radius of the second lens
R4: The image side curvature radius of the second lens.

2. The camera lens according to claim 1 further satisfying the following condition (5):

$$0.60 \leq F3/F \leq 0.95 \tag{5}$$

In which
F: Overall focal distance of the lenses
F3: The focal distance of the third lens.

3. The camera lens according to claim 1 further satisfying the following condition (6):

$$-2.50 \leq F4/F \leq -1.00 \tag{6}$$

In which
F: Overall focal distance of the lenses
F4: The focal distance of the fourth lens.

* * * * *